（12）United States Patent
Lohmann et al.

(10) Patent No.: US 7,336,609 B2
(45) Date of Patent: Feb. 26, 2008

(54) OPTIMIZED METHOD AND OPTIMIZED PROTOCOL ENGINE FOR MESSAGE TRANSMISSION

(75) Inventors: Thomas Lohmann, München (DE); Michael Tüxen, München (DE)

(73) Assignee: Siemens Aktiengesellschaft, Munich (DE)

( * ) Notice: Subject to any disclaimer, the term of this patent is extended or adjusted under 35 U.S.C. 154(b) by 1172 days.

(21) Appl. No.: 10/384,780

(22) Filed: Mar. 11, 2003

(65) Prior Publication Data

US 2004/0022269 A1  Feb. 5, 2004

(30) Foreign Application Priority Data

Aug. 1, 2002  (EP)  .................. 02017325

(51) Int. Cl.
*H04J 1/16* (2006.01)
*H04J 3/14* (2006.01)
*H04L 1/00* (2006.01)
*H04L 12/26* (2006.01)

(52) U.S. Cl. ............ 370/235; 370/229; 370/230; 370/230.1; 370/231; 370/232; 370/352; 370/353; 370/354; 370/355; 370/356; 709/236; 709/230

(58) Field of Classification Search ............ None
See application file for complete search history.

(56) References Cited

U.S. PATENT DOCUMENTS

2002/0093981 A1* 7/2002 Turina et al. ............ 370/467

2003/0202480 A1* 10/2003 Swami ............... 370/252

FOREIGN PATENT DOCUMENTS

WO  00/41365  7/2000

OTHER PUBLICATIONS

A. Jungmaier et al., "SCTP_A Multi-link End-to-end Protocol for IP-based Networks," *International Journal of Electronics and Communications*, vol. 55, No. 1, pp. 46-54, 2001.
R. Stewart et al., "Stream Control Transmission Protocol," © *The Internet Society*, pp. 1-134, Oct. 2000.

* cited by examiner

*Primary Examiner*—Raj K. Jain
(74) *Attorney, Agent, or Firm*—Bell, Boyd & Lloyd

(57) ABSTRACT

A method is provided in which at least one of the following parameters is first determined for a transmitter: parameter representative of the presence of the message oriented memory management feature in the receiver; number of message storage locations provided in the receiver; size of the message storage locations provided in the receiver. A receiver transmits to the transmitter the number of information units still permitted under time control or under event control, the receiver ascertaining this number from the number of messages received or from the number of message storage locations which are still free. The transmitter ascertains the number of messages that can still be transmitted to the receiver from the transmitted number of information units which are still permitted.

10 Claims, 2 Drawing Sheets

FIG 1

A → B: Number=10; Size=1k / Init

B → A: Number=10; Size=1k / Init-Ack

A → B: Cookie-Echo

B → A: Cookie-Ack

FIG 2

Transmitter ← SACK; Recv Wnd=6x1k=6k

Receiver buffer: Free / Used (X X X X)

DATA-Chunk (20 Bytes) → Receiver

Receiver buffer: Free / Used (X X X X X)

Transmitter ← SACK; Recv Wnd=5x1k=5k

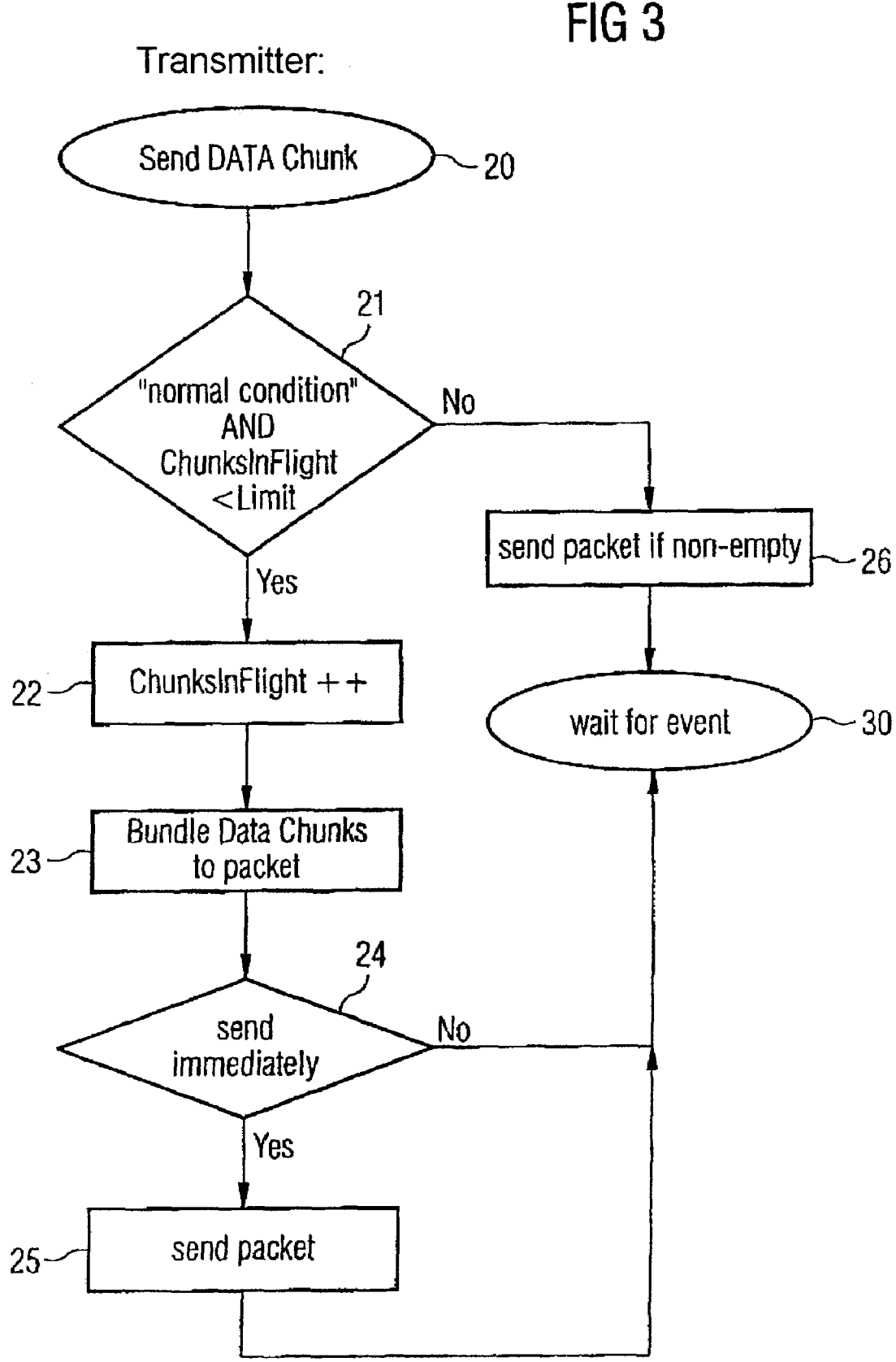

OPTIMIZED METHOD AND OPTIMIZED PROTOCOL ENGINE FOR MESSAGE TRANSMISSION

CLAIM FOR PRIORITY

This application claims priority to Application No. 02017325.8 which was filed in the German language on Aug. 1, 2002.

TECHNICAL FIELD OF THE INVENTION

The invention relates to a system and method for message transmission, and in particular, to message transmission including a receiver having a message oriented memory management feature and a transport protocol located between a transmitter and the receiver which has a flow control feature.

BACKGROUND OF THE INVENTION

Communication using connections in communication networks or between devices (e.g. processors) often involves the information being interchanged between the respective entities on a message basis, i.e. the entities interchange messages which comprise a number of information units (e.g. bytes), with the number of information units which a single message can hold having a lower limit (e.g. 1 byte) and an upper limit (e.g. 4096 bytes).

Since the entities can process information effectively only when using complete messages, memory management for the transmitter and/or receiver is in most cases performed on a message oriented basis, i.e. a defined number of storage locations (e.g. 10) are available which each hold precisely one message, regardless of length.

By contrast, transport is effected using a transport protocol which in many cases has a flow control feature which is oriented to the number of information units (e.g. byte oriented). This is abbreviated to the term "byte oriented" below, but this is not intended to represent any restriction to a byte as the basic information unit; instead, it is intended to clarify the present invention by way of example on the basis of a conventional information unit.

Byte oriented flow control means that a number of bytes is prescribed which the transport protocol can transmit from the transmitter to the receiver without acknowledgement. The various possible message lengths between the lower and upper limits mean that situations can arise in which all the storage locations for messages in the receiver have been used up (for example by short messages) but the byte oriented flow control feature permits further bytes, and hence messages, to be sent, with the messages being rejected in the receiver, however, because there are no longer any storage locations available. This rejection of messages is generally not signaled to the transmitter, however, but rather is established in the transmitter by virtue of a timer timing out. This means that redelivery of the corresponding messages is delayed by at least the running time of this timer, which ultimately means a time loss and additional load on the connection during message transmission.

A known way of toning down the effect resulting from this problem for real systems involves provision of a greater number of storage locations for messages in the receiver. This does not eliminate the conflict, however, but rather merely reduces the frequency of its occurrence.

SUMMARY OF THE INVENTION

In one embodiment of the invention, there is a method for message transmission between a transmitter and a receiver, where the receiver has a message oriented memory management feature and where a transport protocol between the transmitter and the receiver has a flow control feature which is oriented to the number of information units, according to which at least one of the following parameters is first determined for the transmitter: parameter representative of the presence of the message oriented memory management feature in the receiver; number of message storage locations provided in the receiver; size of the message storage locations provided in the receiver, the receiver transmits to the transmitter the number of information units still permitted under time control or under event control, the receiver ascertaining this number from the number of messages received or from the number of message storage locations which are still free, and the transmitter ascertains the number of messages which can still be transmitted to the receiver from the transmitted number of information units which are still permitted.

In another embodiment of the invention, there is a protocol engine or network node or router with a reception apparatus and with a transmission apparatus, where the reception apparatus has a message oriented memory management feature and where a transport protocol supported by the transmission apparatus and the reception apparatus has a flow control feature which is oriented to the number of information units, and where: the transmitter apparatus has means for ascertaining at least one of the following parameters: parameter representative of the presence of the message oriented memory management feature in a further reception apparatus in a further protocol engine which is connected to the protocol engine; number of message storage locations provided in the further reception apparatus; size of the message storage locations provided in the reception apparatus, the reception apparatus has means for transmitting the number of information units still permitted under time control or under event control, the reception apparatus ascertaining this number from the number of messages received or message storage locations which are still free, and the transmission apparatus has means for ascertaining the number of messages which can still be transmitted from a received number of permitted information units.

One advantage of the invention is that, regardless of the current load situation, i.e. even when there is a load situation involving a large number of short messages, no messages are first transmitted to the receiver and rejected there, but rather messages which cannot be received on account of a lack of storage positions in the receiver are held back.

Since no messages need to be rejected, there is no delay which arises when rejected messages are retransmitted under timer control in the absence of confirmation. In addition, unnecessary network load is avoided by virtue of the messages being held back.

The invention has the advantage that a message oriented memory management feature and a transport protocol with a flow control feature oriented to the number of information units are optimally aligned with one another. First, this prevents the maximum number of messages to be sent from restricting the throughput at the outset. Secondly, the fact that the respectively free storage locations are known during operation means that significantly fewer reserves of storage space are required for the high-load case or for brief failure.

Advantageously, the necessary signaling is effected using protocol elements which are chosen such that undisturbed communication can take place even when individual entities have not implemented the inventive method.

BRIEF DESCRIPTION OF THE DRAWINGS

The invention is explained in more detail below as exemplary embodiments with reference to the drawings, in which:

FIG. 1 shows a flow of messages between two transceivers when setting up an SCTP association.

FIG. 2 shows a sequences in the receiver part of a transceiver.

FIG. 3 shows sequences in the transmitter part of a transceiver.

DETAILED DESCRIPTION OF THE INVENTION

The invention is explained below by way of example with reference to the stream control transmission protocol SCTP (IETF RFC 2960). Referring to FIG. 1, an SCTP association is set up between two transceivers A and B. In this case, FIG. 1 shows an example of the otherwise standard setup procedure for the SCTP association. A first transceiver A initiates an association by transmitting an INIT chunk to a second transceiver B. With the INIT chunk, the parameters "number", with an exemplary value of 10, and "size", with an exemplary value of 1 k, corresponding to 1 kbyte, are transmitted. In this case, the "number" parameter signifies the number of storage locations in the receiver part of the first transceiver A, and the "size" value signifies the size of a respective one of these storage locations, with the storage locations preferably being of the same size.

In one alternative, storage locations of various sizes can be provided, with the size of the individual storage locations then being transmitted separately. Since the number of storage locations in the receiver parts is small in practice, the separate transmission of different sizes of storage locations makes no special demands and can expediently be done in said INIT chunk, for example.

The INIT chunk received by the second transceiver B is evaluated, the parameters included are recorded in a suitable memory in the second transceiver B, and an INIT-ACK chunk is transmitted to the first transceiver A. For the second transceiver B, this INIT-ACK chunk includes the parameters "number", again with an exemplary value of 10, and "size", again with an exemplary value of 1 k. In this case, the "number" parameter represents the number of storage locations in the receiver part in the second transceiver B, and the "size" value represents the size of a respective one of these storage locations. The storage locations are preferably of the same size but can also be of different sizes, as already mentioned.

Following the INIT-ACK chunk, the COOKIE-ECHO and COOKIE-ACK chunks are interchanged between the two transceivers.

FIG. 2 shows a situation in the course of operation of the SCTP association between the first transceiver A and the second transceiver B. In this case, the transmission part (transmitter) of the first transceiver A and the reception part (receiver) of the second transceiver B are shown by way of simplification. For the receiver, a single-column memory matrix 10 is shown, which is formed from 10 storage locations, by way of example. The organization of the memory matrix is not relevant for purposes of this invention. For the present example, four storage locations are used, which is indicated by an "x" in the corresponding storage location. Six storage locations are free; and the size of each storage location is 1 k.

At the start of the message flow shown in FIG. 2, a SACK (selective acknowledgement) chunk is transmitted from the receiver to the transmitter, which includes the size of the reception window RecvWnd as a parameter. The size of the reception window is obtained from multiplication of the number of free storage locations by the size of the storage locations, in this case 6×1 k thus gives 6 k. This calculation is performed in the receiver, and the RecvWnd parameter with the value 6 k is transmitted to the transmitter as the result.

If the transmitter now transmits a DATA chunk including user information of 20 bytes to the receiver, this user information being stored in the memory matrix 10, another 5 storage locations are now available in the receiver for further reception of messages. This is signaled by means of a further SACK chunk containing the RecvWnd parameter with the value 5 k. This value is calculated as described above.

In the example described, use of the conventional method would involve the receiver signaling to the transmitter the value 6 k minus 20 bytes instead of the value 5 k (5 storage locations of 1 k each), since the flow control feature operates on a byte oriented basis and not on a message oriented basis. By contrast, in the exemplary embodiment of the invention, the flow control feature is used in order to signal the number of messages which can still be accepted by the receiver.

The transmitter, which receives the SACK chunks with the RecvWnd parameter, calculates the number of messages which can still be transmitted unacknowledged from the value of this parameter and from the size of a storage location in the receiver which is transmitted when the association is set up.

An advantageous transmitter response is now described with reference to FIG. 3. To transmit a DATA chunk, block 20, a test is first performed to determine whether the "normal state" exists and at the same time whether the "ChunksInFlight" parameter is below the limit, block 21. In this case, "normal state" is a simplifying combination of the conditions under which a transmitter which does not have the inventive extension transmits a DATA chunk. For the inventive transmitter, the condition "ChunksInFlight"<limit also needs to be satisfied.

If the test 21 is not satisfied, the packet is sent if it is not empty, block 26, and the transmitter changes over to a waiting state, block 30. In this waiting state, the transmitter waits for further DATA chunks 20 needing to be sent, for example.

If, by contrast, the test 21 is satisfied, the "ChunksInFlight" parameter is first incremented, block 22, and then the chunks which are already provided and the new chunk are bundled to form packets, block 23. A test is then performed to determine whether this packet needs to be sent immediately, block 24. If this is the case, the packet is sent, block 25, and the transmitter changes over to the waiting state 30. If the test 24 is not satisfied, the transmitter changes over directly to the waiting state 30.

In this case, the transmission is made taking into account the flow control feature, whose limitation is oriented to the value of the received RecvWnd.

In order to ensure undisturbed message transmission, for example during a conversion phase in the network, the parameter tags for the parameters transmitted when setting up the SCTP association are chosen such that the respective transmitter of these parameters is informed if the respective receiver cannot process these parameters, and such that the association is set up anyway. This ensures that entities which do not have the inventive extension can communicate with entities which do not have the inventive extension.

For the protocol SCTP, transmission of the parameter representative of the presence of the message oriented memory management feature in the receiver is not necessary, since this is already known on both sides of an SCTP association as a result of the protocol SCTP used.

In one embodiment, the parameter representative of the presence of the message oriented memory management feature in the receiver can be transmitted implicitly, i.e. transmission of the "size" and "number" parameters simultaneously signals that message oriented memory management is provided.

In another embodiment of the invention, the "number" and "size" parameters can be preset administratively for all or selected elements, in which case it is not necessary to transmit these parameters when setting up the SCTP association.

Although the invention has been described with reference to the stream control transmission protocol SCTP, the inventive method can also be applied to other protocols in which the memory management feature is message oriented and the flow control feature is oriented to a number of information units. In this case, the invention is not limited to communication networks but rather can be used in conjunction with connections between processors and/or other modules, for example.

What is claimed is:

1. A method for message transmission between a transmitter and a receiver, the receiver having a message oriented memory management feature and a transport protocol between the transmitter and the receiver having a flow control feature which is oriented to the number of information units, comprising:

determining at least one of the following parameters for the transmitter: a parameter representative of the presence of the message oriented memory management feature in the receiver; a number of message storage locations provided in the receiver; and a size of the message storage locations provided in the receiver;

transmitting from the receiver to the transmitter the number of information units permitted under time control or under event control, the receiver ascertaining the number from the number of messages received or from the number of message storage locations which are free; and ascertaining, via the transmitter, the number of messages which can be transmitted to the receiver from the transmitted number of information units which are permitted.

2. The method as claimed in claim 1, wherein the parameter or the parameters are determined for the transmitter using administrative presets.

3. The method as claimed in claim 1, wherein the parameters are determined for the transmitter using presets which are signaled by the receiver.

4. The method as claimed in claim 1, wherein the information units are bytes and the transport protocol's flow control feature is byte oriented.

5. The method as claimed in claim 4, wherein the transport protocol is a stream control protocol transmission.

6. A transceiver apparatus, comprising: a reception apparatus, the reception apparatus having a message oriented memory management feature and a flow control feature which is oriented to the number of information units; and a transmission apparatus which supports a transport protocol, wherein, the transmission apparatus ascertains at least one of the following parameters: a parameter representative of the presence of the message oriented memory management feature in another reception apparatus in another protocol engine which is connected to the protocol engine;

a number of message storage locations provided in another reception apparatus; and a size of the message storage locations provided in the reception apparatus, the reception apparatus transmits the number of information units permitted under time control or under event control, the reception apparatus ascertaining the number from the number of messages received or message storage locations which are free, and the transmission apparatus ascertains the number of messages, which can be transmitted from a received number of permitted information units.

7. The transceiver apparatus as claimed in claim 6, wherein the transceiver apparatus stipulates administrative presets for the parameter or parameters for the transmission apparatus.

8. The transceiver apparatus as claimed in claim 6, wherein the stipulates presets signaled by the another reception apparatus for the parameter or parameters for the transmission apparatus.

9. The transceiver apparatus as claimed in claim 6, wherein the information units are bytes and the transceiver apparatus has a transport protocol flow control feature which is byte oriented.

10. The transceiver apparatus as claimed in claim 9, wherein the transport protocol is a stream control transmission protocol.

* * * * *